Dec. 7, 1948.  L. D. STATHAM  2,455,883
ELECTRIC PRESSURE STRAIN GAUGE
Filed April 10, 1945  2 Sheets-Sheet 1
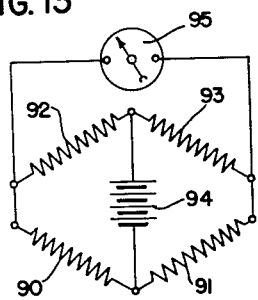
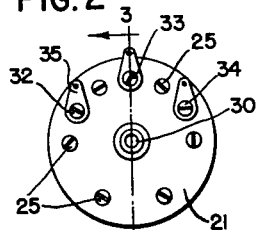
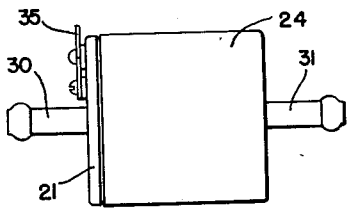
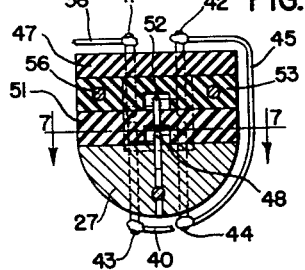
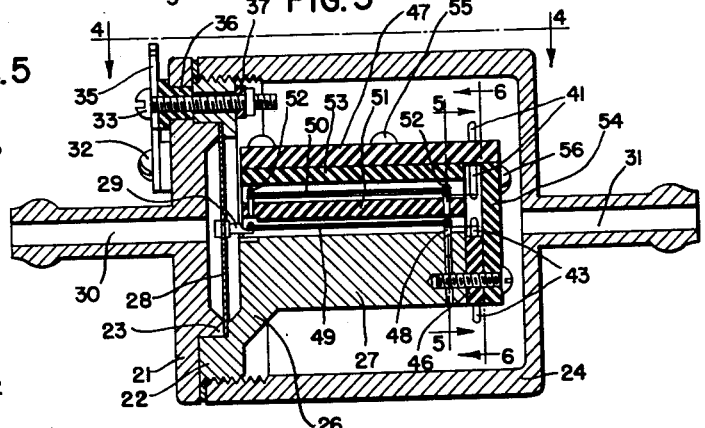
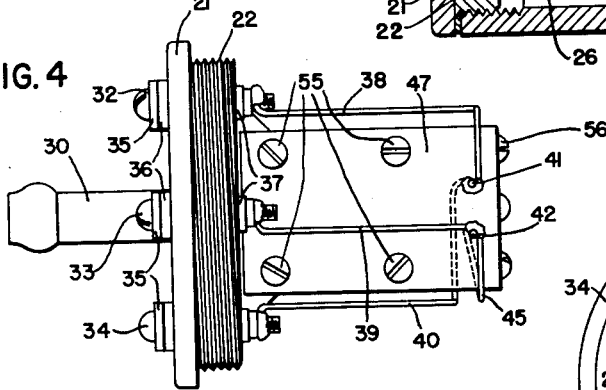
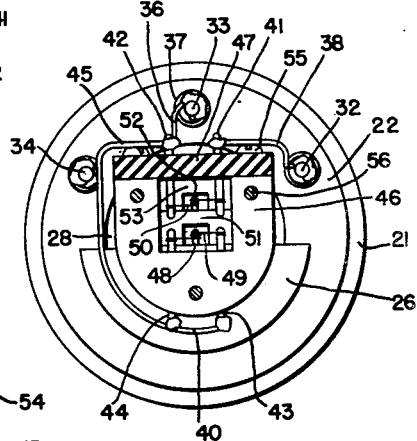
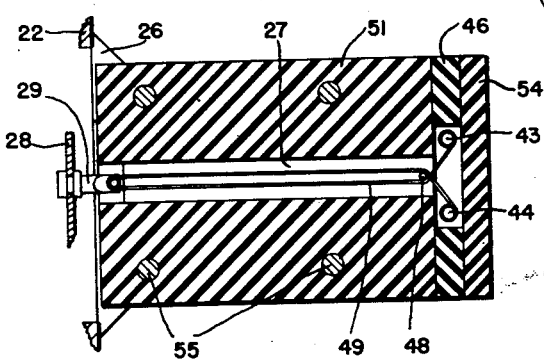
INVENTOR.
LOUIS D. STATHAM
BY George F. Goodyear
ATTORNEY Dec. 7, 1948.   L. D. STATHAM   2,455,883
ELECTRIC PRESSURE STRAIN GAUGE
Filed April 10, 1945   2 Sheets-Sheet 2
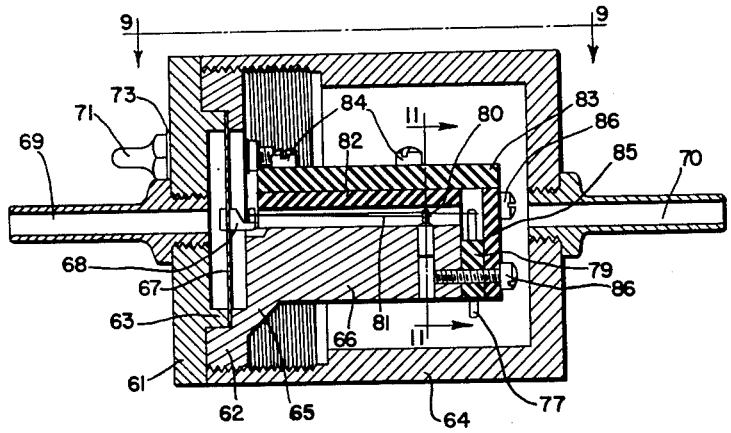
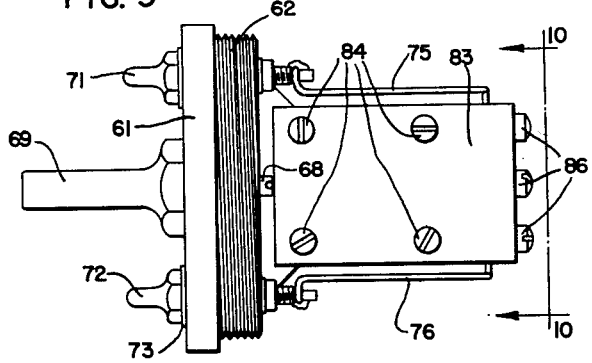
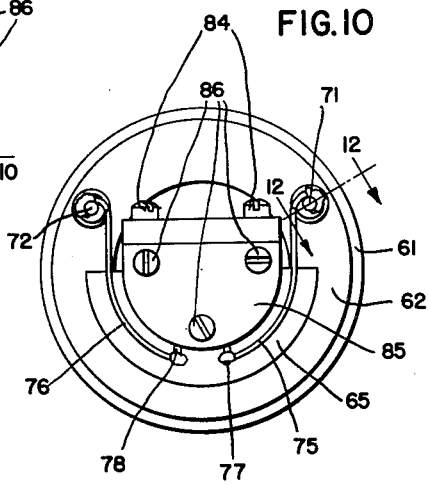
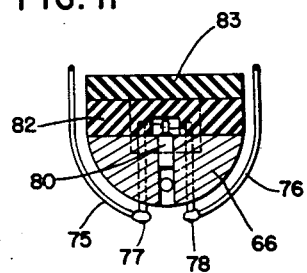
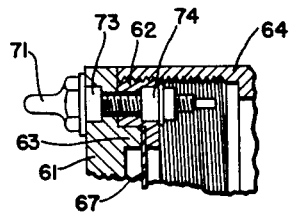
*INVENTOR.*
LOUIS D. STATHAM
BY *George F. Goodyear*
ATTORNEY Patented Dec. 7, 1948

2,455,883

UNITED STATES PATENT OFFICE 2,455,883

ELECTRIC PRESSURE STRAIN GAUGE

Louis D. Statham, Beverly Hills, Calif., assignor to Curtiss-Wright Corporation, a corporation of Delaware Application April 10, 1945, Serial No. 587,629

7 Claims. (Cl. 201—63)

This invention relates to instruments for measuring and indicating fluid pressure. More particularly, it relates to fluid pressure gages in which the indicating elements are operated by electrical means.

In accordance with the present invention, a novel type of pressure gage has been developed, which has a number of important advantages and uses. Instruments constructed in accordance therewith are compact in size, simple and light in construction, and can be easily and quickly calibrated. They can be made of high sensitivity over a relatively narrow range of pressures, or of lower sensitivity over a wide range of pressures. They can be made to indicate either liquid or gaseous pressures in either high or low pressure ranges. They are particularly applicable for pressures which vary at high frequencies, and indicate the variations in such pressures with remarkable fidelity. Other advantages will appear as the present description proceeds.

In the drawings: Figure 1 is a side elevational view of one form of pressure gage according to the present invention; Figure 2 is an end elevational view of the pressure gage shown in Figure 1; Figure 3 is an enlarged sectional view taken along the line 3—3 of Figure 2; Figure 4 is a view taken along the line 4—4 of Figure 3, with the outer cover removed; Figure 5 is a section taken along the line 5—5 of Figure 3; Figure 6 is a section taken along the line 6—6 of Figure 3; Figure 7 is a section on a still larger scale taken along the line 7—7 of Figure 5; Figure 8 is a sectional view of a modified form of the invention, corresponding to Figure 3 of the first embodiment; Figure 9 is a view taken along the line 9—9 of Figure 8, with the outer cover removed; Figure 10 is a view taken along the line 10—10 of Figure 9; Figure 11 is a section taken along the line 11—11 of Figure 8; Figure 12 is a section taken along the line 12—12 of Figure 10; and Figure 13 is a schematic wiring diagram of a circuit in which the instrument according to the present invention may be incorporated.

In accordance with this invention, pressure is measured as a function of the change in electrical resistance of a length of wire, known as strain wire, which constitutes the sensitive element of the instrument. The wire is caused to change in length, and consequently in electrical resistance, as the result of movement of a pressure sensitive diaphragm. One end of the wire itself is fastened, by means of a suitable support, to the center or other movable portion of the diaphragm, while the opposite end of the wire is fastened, under suitable tension, to part of the framework supporting the diaphragm. Movement of the diaphragm in either direction thus causes the wire to change in length. The diaphragm preferably is of such material and size as to take the major portion of the load due to pressure changes, such as in excess of 90 or 95 per cent, while the strain wire is of such size and material as to take as little of the load as possible. Thus, the strain wire should be of such extremely small diameter that the change in tension in the wire with change of length will not appreciably dampen or otherwise affect movement of the diaphragm. For a diaphragm 0.016 inch thick, six strands of Constantan wire each 0.001 inch in diameter and ¾ inch long has proved to be a useful combination.

The strain wire constituting the sensitive element of the instrument should also be extremely uniform in size and electrical resitivity and should be linear in its response to change of resistivity due to change of length. Preferably it is of material, such as "constantan" or "Advance," which has a relatively low temperature coefficient of resistivity.

The wire may be attached to its supports under a very slight tension. If, however, the pressure is apt to vary an equal amount in either direction from normal conditions, it is preferably attached under such a tension that it is stretched to one half its elastic limit. Thus, it can either shrink or elongate, depending upon which way the diaphragm is caused to move.

The theory of thin plates shows that a diaphragm which is clamped at its edges, when loaded by a uniform distribution of pressure, will be deflected at the center by an amount in linear proportion to the amount of pressure, up to a deflection equal to approximately one eighth the thickness of the diaphragm. The dimensions of the diaphragm (diameter and thickness) are therefore selected so that the maximum pressure for which the instrument is designed will deflect the center of the diaphragm by a distance equal to one eighth the thickness of the diaphragm.

The strain wire constituting the sensitive element is electrically connected so as to constitute one arm of a Wheatstone bridge. With the four arms of such a bridge approximately equal in resistance, the variation in output voltage of the bridge is directly proportional to the change in resistance of the strain wire, in accordance with well known principles of Wheatstone bridge construction. The pressure can then be read on a suitable galvanometer, whose scale divisions can be caused to read directly in pounds per square inch or other desired pressure unit. If desired, the Wheatstone bridge, galvanometer and current source can all be incorporated in the same housing with the instrument proper. For many applications, however, a distinct advantage of the present invention is that the instrument proper (normally of small size) may be located at a considerable distance from any recording or indicating equipment, without loss of accuracy and sensitivity and without any time lag in responding to changes in pressure.

In Figures 1 to 7 inclusive there is illustrated a form of the invention applicable to the measurement, indication and recording of pressures from zero to 15 pounds per square inch, and which may vary at high frequencies, such as up to 200 or more cycles per second. This instrument is small and compact, being slightly over one inch in diameter, and embodies in its construction both the active or pressure sensitive bridge arm and one adjacent bridge arm incorporated for temperature compensating purposes. The instrument is enclosed in a case or housing, including a base plate 21, a threaded collar 22 fitting over a projecting hub portion 23 of the base plate 21, and a threaded cover member 24 threadably engaging the collar 22. The collar 22 is attached to the base plate 21 by means of screws 25. Attached to the collar 22 is a semicircular sloping shoulder 26, the latter in turn being attached to a semicylindrical post 27. The collar 22, the shoulder 26 and the post 27 are preferably one integral piece. The base plate 21 and cover member 24 may be constructed out of metal, such as aluminum, while the collar 22 and its associated post and shoulder are preferably constructed out of aluminum provided with an anodized surface. With this construction, stability, strength and freedom from temperature and humidity effects is readily secured.

Clamped between the base plate 21 and the collar 22 is a circular metallic diaphragm 28, to the center of which is secured a hook 29. The diaphragm 28 is of aluminum, brass or other suitable metal of the required elasticity. The hook 29, however, is preferably of anodized aluminum, the anodized coating providing an insulated surface. The outer surface of the diaphragm 28 is exposed to the pressure to be measured through a pressure inlet 30. The inner surface of the diaphragm, on the other hand, is exposed to static or standard pressure through a static inlet 31.

External electrical connections are provided by means of three binding posts 32, 33 and 34 which may be provided with solder lugs 35 for soldering to external leads. The binding posts pass through both the base plate 21 and the collar 22, being insulated therefrom by means of insulating washers 36 and 37. Internally, the three binding posts 32, 33 and 34 are electrically connected by means of leads 38, 39 and 40, respectively, to three pins 41, 42 and 43, respectively, such as by soldering. Pin 42 is also electrically connected by means of a lead 45 to a fourth pin 44. The internal leads 38, 39, 40 and 45 are omitted from Figure 2 of the drawings, for the sake of clearness in illustration. The pins 43 and 44 are embedded in and extend through the cross-arm of a U-shaped plate 46 of insulating material, such as a fabric-resin laminate. The pins 41 and 42 pass through a rectangular protecting plate 47 also of insulating material.

At the upper end of semi-cylindrical post 27 is a pin 48 which may be integral with the post, and is provided with an insulating surface, such as anodized aluminum. One end of a length of strain wire 49 is soldered to the pin 43, passed successively around the pin 48 and the hook 29 with predetermined tension, and the opposite end soldered to the pin 44. This strain wire constitutes the sensitive element of the instrument. It is easily seen that the ends of the strain wire 49 are electrically connected, by means of the wiring connections heretofore described, to the terminals 33 and 34, respectively. The latter two terminals are connected so as to form an arm of a Wheatstone bridge.

In order to compensate for expansion or contraction of the strain wire 49 due to temperature changes, a second strain wire 50 is wound between two pins 52 (also constructed of anodized aluminum) mounted on a rectangular plate 51 fitting against the flat side of post 27. The strain wire 50 is wound with the same tension and in the same fashion as strain wire 49, its two ends being soldered to pins 41 and 42, respectively. Thus, the two ends of the wire 50 are electrically connected to the posts 32 and 33, and are incorporated as a second arm of the Wheatstone bridge. Although this arrangement secures some temperature compensation, the effect of temperature on the diaphragm 28 is such that it is preferred to maintain the instrument at constant temperature. The plate 51 is provided with a longitudinal groove, as shown clearly in Figures 5 and 7, for the accommodation of hook 29, pin 48 and strain wire 49. A rectangular protecting plate 53, provided with a similar groove for the accommodation of pins 52 and temperature compensating wire 50, is inserted between the plates 47 and 51. An end protecting plate 54 is placed over the U-shaped plate 46. The plates 46, 53 and 51 are attached to post 27 by means of retaining screws 55. Plates 54 and 46 are attached to post 27 and to plate 53 by means of retaining screws 56.

The operation of the instrument shown in Figures 1 to 7 inclusive is readily apparent from the above description. Any change in pressure on the pressure inlet side of diaphragm 28 will cause a deflection of the diaphragm in one direction or the other, the direction depending upon whether the pressure increases or decreases. Movement of the diaphragm will in turn cause an expansion or contraction of the strain wire 49, and thus a decrease or increase in the electrical resistance. The latter may be measured in a conventional Wheatstone bridge circuit, as hereinafter described.

The form of the invention illustrated in Figures 8 to 12 inclusive is somewhat simpler, in that a temperature compensating bridge arm is not incorporated in the instrument. The instrument is enclosed in a case or housing including a base plate 61, a threaded collar 62 fitting over a projecting hub portion 63 of the base plate 61, and a threaded cover member 64 threadably engaging the collar 62. The collar 62 is attached to the base plate 61 by any convenient means such as screws, as shown in the form of Figure 2. Integral with the collar 62 is a semi-circular sloping shoulder 65, the latter in turn being integral with a semi-cylindrical post 66. The base plate 61, cover member 64, collar 62, post 66 and shoulder 65 are similar in purpose and materials of construction to the corresponding elements of the form of the invention illustrated in Figures 1 to 6, inclusive.

Clamped between the base plate 61 and the collar 62 is a metallic diaphragm 67, to the center of which is secured a hook 68. The diaphragm 67 is of aluminum, brass or other suitable metal of the required elasticity. The hook 68, however, is preferably anodized aluminum, the anodized coating producing an insulated surface. The outer surface of the diaphragm 67 is exposed to the pressure to be measured through a pressure inlet nipple 69. The inner surface of the diaphragm, on the other hand, is exposed to static or standard pressure through a static inlet nipple 70.

External electrical connections are provided by a pair of binding posts 71 and 72 passing through both the base plate 61 and the collar 62, as shown in Figure 12, being insulated therefrom by means of insulating washers 73 and 74. Internally, the two binding posts 71 and 72 are electrically connected by means of leads 75 and 76 (omitted from Figure 8 of the drawings for the sake of clearness in illustration), respectively, to a pair of pins 77 and 78, respectively, such as by soldering. The pins 77 and 78 are embedded in and extend through the cross arm of a U-shaped plate 79 of insulating material, such as a fabric-resin laminate.

In the upper end of semi-cylindrical post 66 is a pin 80, which may be integral with the post and is provided with an insulating surface, such as anodized aluminum. One length of strain wire 81 is soldered to the pin 77, passing successively around the pin 80 and the hook 68 with predetermined tension and the opposite end soldered to the pin 78. This strain wire constitutes the sensitive element of the instrument. It is easily seen that the ends of the strain wire 81 are electrically connected by means of the wiring connections heretofore described to the terminals 71 and 72 respectively. The latter two terminals are connected so as to form an arm of a Wheatstone bridge. A rectangular protecting plate 82 provided with a longitudinal groove, as shown in Figure 11, for the accommodation of hook 68, pin 80 and strain wire 81, is superimposed upon the flat side of the post 66 as shown. A second rectangular protecting plate 83 is superimposed upon the first plate, the second plate being affixed to the post 66 by means of screws 84. An end protecting plate 85 is placed over U-shaped plate 79, both plates 79 and 85 being attached to post 66 and to plate 82 by means of retaining screws 86. The operation of the instrument shown in Figures 8 to 12, inclusive, is similar to the operation of the instrument shown in Figures 1 to 7, inclusive.

In both forms of the invention illustrated it is preferred that the integral member consisting of the collar, shoulder and post (22, 26 and 27 in Figure 3 and 62, 65 and 66 in Figure 8) be made out of metal, preferably black anodized aluminum, for the purpose of minimizing temperature effects on the strain wire. The elements 46, 47 and 54 in Figure 3 and 79, 83 and 85 in Figure 8 are of insulating material, such as a fabric-resin laminate. The elements 51 and 53 in Figure 3 and 82 in Figure 8 may be of fabric-resin insulating material or of back anodized aluminum to minimize temperature effects on the strain wire.

Referring now to Figure 13, a suitable wiring arrangement for the instrument according to the present invention is schematically illustrated therein. The active resistance element 90 corresponds to the wire 49 in the form of the invention illustrated in Figures 1 to 7, inclusive, and to the wire 81 in the form illustrated in Figures 8 to 12 inclusive. The resistance element 91 corresponds to the temperature compensating wire 50 in the form illustrated in Figures 1 to 7, inclusive, while the corresponding element in the form of the invention illustrated in Figures 8 to 12, inclusive, is not included in the instrument proper. The remaining two resistance elements 92 and 93 are not incorporated in either of the instruments proper. However, it may be desired to provide an instrument having all four resistors 90, 91, 92 and 93 incorporated in the instrument proper. In this case, a duplicate set up of the mounting structure for wire 49, shown to the right of the diaphragm 28 in Figure 3, might be provided. Such a structure might be mounted on the left of the diaphragm 28, and therefore include an active wire that would contract as the wire 28 expands, and vice versa. Four external connections would then be provided, two to the power source and two to an indicating or recording instrument, such as a galvanometer.

In any case, the four resistors 90, 91, 92 and 93 constitute the four arms of a Wheatstone bridge, as shown in Figure 13. These are connected in conventional fashion to a power source such as a battery 94, and to a recording or indicating instrument such as a galvanometer 95. The power source may include an oscillator or other similar source of alternating current, while the output circuit feeding the galvanometer or other indicating or recording equipment, such as an oscillograph, may include amplifiers, rectifiers and the like. The bridge itself may be either normally balanced or normally unbalanced, depending on whether alternating or direct current is used as the power source, and depending upon the direction of pressure fluctuations.

From the above description, it will be seen that there has been provided an extremely accurate and compact instrument for the measurement and/or recording of pressure. The instrument is particularly applicable to making accurate time studies and faithfully recording pressures varying at high frequencies. Many other uses will also be apparent from the above description.

The above description has been with reference to several specific forms of the invention. It is to be understood, however, that the invention is not to be limited except as defined in the appended claims.

I claim:

1. In a pressure gage, a member having a fluid passage therethrough and means for connecting said passage to a source of fluid pressure to be measured, a diaphragm having its peripheral portion seating on said member with its intermediate portion flexible in response to variations in fluid pressure introduced through said passage, a collar secured to said member and clamping said peripheral portion of the diaphragm to the member, the collar having an arm substantially rigid therewith, an insulating pin carried by said arm, a pair of wire anchoring elements insulated from and carried by the arm adjacent said pin, a hook carried by the central portion of the diaphragm, a strain wire having its end portions anchored to said anchoring elements and the wire being wound under tension around said hook and said pin, the spans of the wire between the hook and pin extending along lines substantially normal to the plane of the diaphragm, flexure of the diaphragm being resisted only by the strain wire connected thereto by said hook, and the diaphragm being so proportioned relative to the strain wire that the latter will bear not more than about ten per cent of the pressure load exerted on the diaphragm.

2. In a pressure gage, a body comprising a base member and a cover member, each of said members having a fluid passage therethrough, and a collar secured to the base member; a diaphragm having its peripheral portion clamped between said base member and said collar and dividing the body interior into two chambers, the central portion of the diaphragm being flexible in response to variations in fluid pressure within said chambers and carrying a hook; the collar having an arm substantially rigid therewith extending into the chamber within the cover member, an insulating pin carried by said arm, a pair of wire anchoring elements insulated from and carried by the arm adjacent said pin; a strain wire secured at its ends to said anchoring elements and wound under tension around said pin and said hook, and a shield adjacent said arm and therewith defining a structure substantially encasing said wire.

3. In a pressure gage, a body comprising a base member and a cover member, each of said members having a fluid passage therethrough, and a collar secured to the base member; a diaphragm having its peripheral portion clamped between said base member and said collar and dividing the body interior into two chambers, the central portion of the diaphragm being flexible in response to variations in pressure differential existing between said chambers, and a first wire support carried by said central portion of the diaphragm; the collar having an arm substantially rigid therewith extending into the chamber within the cover member, a second wire support and an insulator carried by said arm, a pair of wire anchoring elements extending through said insulator, a strain wire connected at its ends to said anchoring elements on one side of the insulator and wound under tension around said wire supports, a shield adjacent said arm and with said arm and insulator defining a structure substantially encasing said wire, a pair of terminals extending through one of said members, and a pair of electric conductors connecting said terminals to said anchoring elements on the opposite side of said insulator.

4. In a pressure gage, a base member and a collar member secured thereto, a diaphragm having its peripheral portion clamped between the base and collar, a cover secured to one of said members and with said diaphragm defining a chamber, the collar having an arm substantially therewith extending into said chamber, a strain wire tensioned between an anchorage on the center portion of the diaphragm and a pair of insulated anchorages on said arm, the tension of the span of said wire between said anchorages being varied upon flexure of the diaphragm, a shield adjacent said arm and with said arm defining a structure substantially encasing said wire, a pair of insulated terminals extending through the base member and collar, and a pair of electric conductors within said chamber connecting said terminals with the anchorages on said arm.

5. In a pressure gage, a frame comprising a base member and a collar member secured thereto, a diaphragm having its peripheral portion clamped between the base and collar and carrying an insulating element at its central portion, a cover secured to the frame and with the diaphragm defining a chamber, the collar having an arm substantially rigid therewith extending into said chamber, a pair of insulated wire anchorages carried by the arm, a strain wire tensioned between one of said anchorages and said insulating element, and between the latter and the other of said anchorages, a pair of insulated terminals extending through said frame into said chamber, and a pair of electric conductors in said chamber connecting said terminals and said anchorages.

6. In a pressure gage, a supporting body, a diaphragm having its marginal portion rigidly secured to said body, means associated with said body whereby differential fluid pressures may be applied to opposite faces of the diaphragm for flexing the central portion thereof, a tensioned strain wire anchored at its ends to said body at points spaced axially from the diaphragm and anchored at its intermediate portion to said diaphragm, differential pressures on the diaphragm being borne entirely by the diaphragm and the strain wire with not more than approximately ten per cent thereof being borne by the strain wire.

7. In a pressure gage, a frame comprising a member having a fluid passage therethrough for admission of fluid pressure and a collar member secured to said first-mentioned member, a diaphragm having its peripheral portion clamped between said members, said diaphragm having its intermediate portion flexible in response to variations in fluid pressure upon the opposite faces thereof, one of said members having an arm substantially rigid therewith, a hook carried by the central portion of the diaphragm, wire anchoring means carried by said arm, and a strain wire having its end portions connected to said anchoring means and at least one intermediate portion thereof engaging said hook, the spans of wire between the hook and said anchoring means extending in tension along lines substantially normal to the plane of the diaphragm, and the diaphragm being so proportioned relative to the strain wire that the latter will bear not more than about ten percent of the pressure load exerted on the diaphragm.

LOUIS D. STATHAM.

REFERENCES CITED

The following references are of record in the file of this patent:

UNITED STATES PATENTS

| Number | Name | Date |
| --- | --- | --- |
| 2,148,013 | Carlson | Feb. 21, 1939 |
| 2,360,886 | Osterberg | Oct. 24, 1944 |
| 2,405,199 | Faust et al. | Aug. 6, 1946 |